United States Patent [19]

Amaro

[11] 4,318,037
[45] Mar. 2, 1982

[54] VOLTAGE REGULATOR

[75] Inventor: David Amaro, Kansas City, Mo.

[73] Assignee: Zenith Radio Corporation, Glenview, Ill.

[21] Appl. No.: 209,164

[22] Filed: Nov. 21, 1980

[51] Int. Cl.³ .............................................. H01J 29/70
[52] U.S. Cl. ...................................... 315/411; 358/190
[58] Field of Search .................. 315/411, 408; 358/190

[56] References Cited

U.S. PATENT DOCUMENTS 4,112,465 9/1978 Willis .................................... 315/411
4,240,013 12/1980 Wedam ............................... 315/411

Primary Examiner—Theodore M. Blum

[57] ABSTRACT

A voltage regulator is described for use in a television receiver having a horizontal oscillator for exciting a horizontal sweep system and a power source for energizing the receiver. In a receiver which also includes a voltage source derived from the excited sweep system, the regulator preferably includes an input port for receiving current from the power source and a circuit responsive to that current for initially energizing the horizontal oscillator so that the sweep system becomes excited. The regulator also includes an input/output port for receiving current from the sweep-derived voltage source and an on/off switch which is turned on responsive to the input/output port being driven above a minimum voltage level. The "on" condition of the switch enables a series pass regulator for coupling current from the input port to the input/output port such that the latter port is held at a regulated voltage level. Current at a regulated voltage level is thus available at the input/output port for powering other circuitry within the receiver.

10 Claims, 4 Drawing Figures

VOLTAGE REGULATOR

BACKGROUND OF THE INVENTION

This invention is directed generally to improvements in voltage regulators, and particularly to voltage regulators for use in television receivers.

Conventional television receivers employ a horizontal oscillator which drives a horizontal output transformer across which a high voltage sweep signal is developed. The latter signal is coupled to a cathode ray tube for deflecting the electron beam or beams horizontally.

An AC signal developed by the horizontal output transformer is also frequently rectified and used as a power source for the receiver's regulated DC power supply. The latter supply is usually employed to energize the various circuits within the receiver and to stabilize the power supply for the horizontal oscillator after it has been excited.

The problem which arises with such an arrangement is that the horizontal oscillator must be first energized to excite the horizontal output transformer, and yet the rectified output of the latter transformer is used to develop the regulated DC supply which powers the horizontal oscillator. Clearly, the horizontal oscillator must be at least initially powered by something other than a source developed from the horizontal output transformer if the horizontal oscillator is to be energized at all.

In line-operated receivers, i.e., receivers not employing a power transformer to isolate the receiver from the AC line, diode rectifiers receive the AC line voltage and develop an unregulated DC supply which may be coupled through a resistor or the like to the horizontal oscillator. Hence, the horizontal oscillator is energized as soon as line power is applied to the receiver. However, a considerable amount of power is spent in the resistor. In addition, the voltage energizing the horizontal oscillator is not usually as regulated as is desired.

Other methods for exciting the horizontal oscillator include employing a so-called "start-up" transformer for exciting the horizontal oscillator. The added expense of that approach is, of course, undesirable.

Accordingly, there is a need for a reliable, inexpensive, and efficient regulator for initially energizing the horizontal oscillator in line-operated television receivers and for thereafter driving a regulated DC supply voltage from the horizontal sweep system. In fact, the same need exists for any television receiver whose regulated DC supply is derived from the horizontal sweep system.

A voltage regulator which meets the needs described above will preferably be capable of use in a variety of television receivers. For example, in black and white receivers, the trend is to include most of the low power circuits on a single integrated circuit chip. That same chip would desirably contain a voltage regulator of the type described above.

To obtain maximum use of the single chip, it is desirable that the voltage regulator be usable in receivers that are battery operated as well as in receivers which are operated from a conventional AC source.

OBJECTS OF THE INVENTION

It is a general object of the invention to provide an improved voltage regulator for use in a television receiver.

It is a more specific object of the invention to provide an improved voltage regulator for initially energizing a television receiver's horizontal oscillator and for deriving a regulated DC voltage from the receiver's horizontal sweep system.

It is another object of the invention to provide such a voltage regulator which is more efficient, reliable and inexpensive than presently available, and which is also capable of providing a regulated DC voltage in receivers powered from a battery source or the like.

BRIEF DESCRIPTION OF THE FIGURES

The objects stated above and other objects of the invention are more particularly set forth in the following detailed description and in the accompanying drawings of which.

DESCRIPTION OF THE PREFERRED EMBODIMENT

Figure 1:
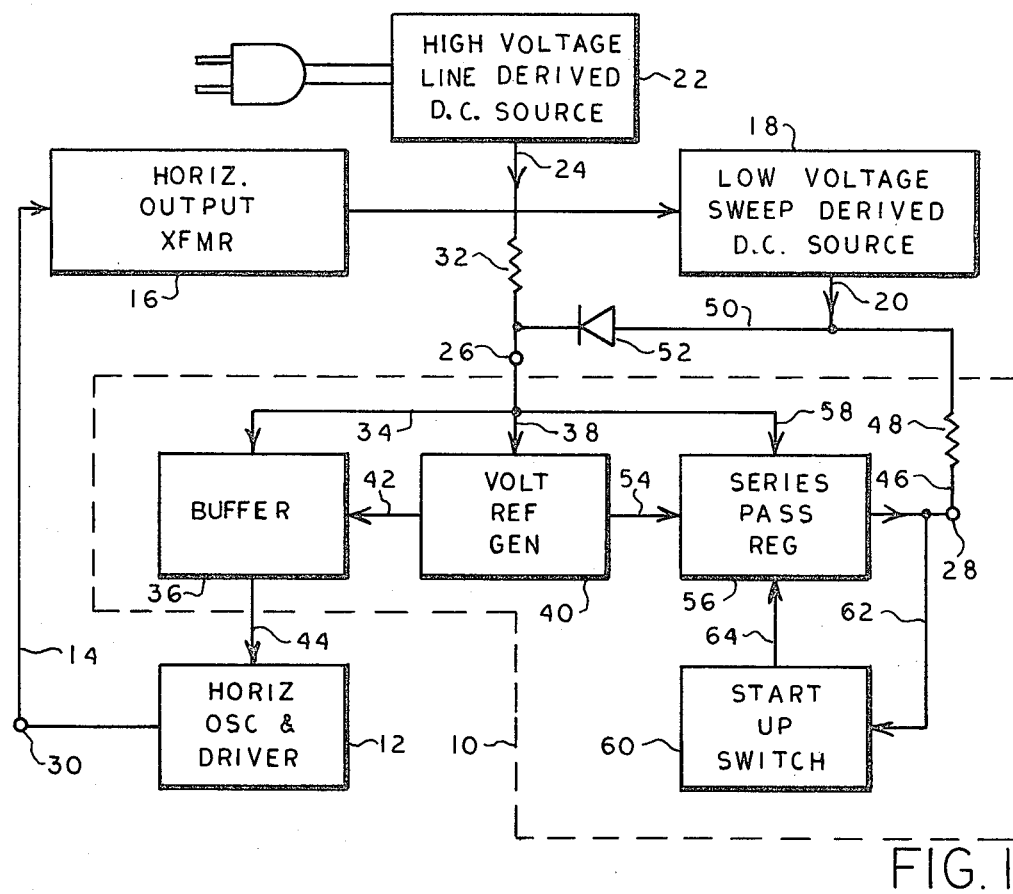
FIG. 1 is a block diagram of a voltage regulator according to the invention as typically interfaced with other conventional circuit elements in a television receiver.

Referring now to the figures in which like reference numerals refer to like elements, and referring particularly to FIG. 1, a voltage regulator 10 is shown in association with conventional circuit elements of a television receiver.

The illustrated arrangement includes a horizontal oscillator and driver 12 which develops an AC signal of approximately 15.75 kilohertz on a lead 14. The latter signal is used to excite a horizontal sweep system illustrated herein as an output transformer 16 which conventionally develops voltages for accelerating and deflecting one or more electron beams in the receiver. A low voltage sweep-derived DC voltage source 18 is responsive to the excitation of the transformer 16 for developing a DC voltage at the lead 20. By way of example, the source 18 may include a winding associated with the transformer 16 and a rectifier for rectifying a low level 15.75 kilohertz signal to develop a low level DC signal of about 12 volts.

The receiver may also include a high voltage line-derived DC source 22. For example, the source 22 may receive a conventional 115 volt AC input from a power line and may include a rectifier and a filter for developing a 124 volt DC source on the lead 24. Herein, the term "line-derived source" refers to any power source which is available to the receiver immediately upon turning the receiver on. In contrast, the sweep-derived source 18 is activated only after the transformer 16 is excited.

As described in more detail hereinafter, the illustrated embodiment of the regulator 10 is preferably built on a single integrated circuit chip which receives current from the line derived source 22 at an input port or pin 26 for initially energizing the horizontal oscillator. When the latter has excited the transformer 16, the sweep-derived source 18 supplies current to the input port 26 and to an input/output port 28 for effecting regulated energization of the horizontal oscillator and for supplying current at a regulated DC voltage level at the input-/output port 28. The latter port thus acts as a source of current and voltage for other circuitry in the receiver.

It should also be noted that the horizontal oscillator and driver 12 is preferably included on the same chip as the regulator 10. Hence, an output port 30 is shown schematically as another integrated circuit pin. Moreover, it is contemplated that other signal processing circuitry will be included on the same chip with the regulator 10. That other circuitry will also preferably be powered by the current available at the port 28.

To initially energize the horizontal oscillator, the port 26 receives current from the line-derived source 22 via a resistor 32. That current is coupled via a lead 34 to a buffer 36 and, via a lead 38, to a voltage reference generator 40. If the current received from the resistor 32 is of a sufficient value, the generator 40 develops a reference voltage on a lead 42 for translation by the buffer 36 to a temperature-regulated voltage on the lead 44. The latter lead is coupled to the horizontal oscillator and driver 12 for energizing the horizontal oscillator so that the sweep system (transformer 16) becomes excited.

Even if the current received via the resistor 32 is less than that required by the generator 40 for establishing its reference voltage at the lead 42, a voltage on the lead 42 can be generated which is sufficient to cause energization of the horizontal oscillator. The value of the resistor 32 is selected such that at least the minimum current needed by the generator 40 to energize the horizontal oscillator is received at the input port 26.

With the transformer 16 having been excited, a voltage (12 volts, for example) is now available at the lead 20 for use by the regulator 10 in providing regulated energization of the horizontal oscillator and in providing a regulated voltage at the input/output port 28. Toward this end, the source 18 provides a current input to the regulator 10 at the input port 26 and at the input-/output port 28. The latter port is adapted to receive current from the source 18 via a current path 46 in which a resistor 48 is disposed for determining the value of current in the path 46.

A current path 50 to the input port 26 is established through a diode 52 which, when forward biased by the source 18, passes current from the source 18 to the port 26 to augment the current flowing into the port 26 from the source 22. With the diode 52 forward biased, most of the current supplied to the port 26 is derived from the source 18, and the voltage at the port 26 is raised toward its nominal design level.

Utilization of the current supplied from the source 18 is as follows. The voltage reference generator 40 receives the current applied to the input port 26 for developing a reference voltage at lead 42 and at another lead 54. The reference voltage generated at the lead 42 provides an input to the buffer 36 for continuing the energization of the horizontal oscillator. Although the horizontal oscillator's initial energization may not have necessarily developed invariant oscillations, the stable reference voltage now developed by the reference generator 40 stabilizes the operation of the horizontal oscillator.

The reference voltage present on the lead 54 is applied to regulator means, shown herein as a series pass regulator 56. The regulator 56, a switched-mode device, receives current from the input port 26 via a lead 58, and is adapted to be turned on by a start-up switch 60 such that, when on, the regulator 56 couples that current to the input/output port 28 in a regulated manner such that the voltage at the port 28 is held to the value of the reference voltage on the lead 54.

To control turn-on of the regulator 56, the start-up switch 60 is adapted to assume a first (OFF) condition prior to the sweep system being excited and a second (ON) condition responsive to excitation of the sweep system. When the switch 60 is in its first or OFF condition, the regulator 56 is held off, and when the switch 60 assumes its second or ON condition, the regulator 56 is turned on and held on as long as the switch 60 remains in its ON condition.

More specifically, the start-up switch 60 is coupled to the input/output port 28 via a lead 62 so that a portion of the current flowing from the source 18 to the input-/output port is received by the start-up switch. Prior to excitation of the sweep system, the source 18 is, of course, not activated and no current flows in the path 46 to the input/output port. Hence, in this condition, the start-up switch and the regulator 56 remain off. When the sweep system becomes excited, the source 18 supplies current to the input/output port 28 and to the start-up switch 60 via the lead 62. When the current thus supplied from the source 18 establishes at least a minimum voltage (6 volts, for example) on the lead 62, the switch 60 switches from its off condition to its on condition and turns on the regulator 56 via a lead 64. Now the regulator 10 is completely operative and provides a source of current at the input/output port 28 for use in powering other circuitry (not shown) within the receiver. The series pass regulator 56 holds the input-/output port at a regulated voltage level, which level is preferably the reference voltage level developed by the reference generator 40.

An important aspect of the illustrated arrangement is that the current available for use at the input/output port is derived mainly from the source 18. Typically, the source 18 provides a low level DC voltage, 12 volts for example, at its output lead 20. The line-derived source 22, however, typically provides a higher level voltage, 124 for example, at its output lead 24. By keeping the current from source 22 quite low, only enough to start the horizontal oscillator and driver 12, and by augmenting the current input at port 26 with a substantial current from source 18 via the path 50 after excitation of the sweep system, the input port 26 receives current at a relatively low voltage level. Hence, less power is dissipated.

Another significant aspect of the illustrated arrangement resides in the fact that current is supplied to the input/output port via two paths, one path being internal of the regulator 10 and the other path being external to the regulator 10. The internal path is from the input port 26, through the series pass regulator 56, and thence to the input/output port. The external path is from the source 18 through the resistor 48 to the input/output port. To minimize power dissipation in the regulator 10, particularly where it is constructed on an integrated circuit chip, a large fraction of the current available at the input/output port is derived from the external path.

The remainder of the current is supplied via the internal path through the series pass regulator. Hence, by selecting an appropriate value for the resistor 48, the desired division of current between the internal path and the external path may be achieved for a given output voltage and a given input voltage variation range. Preferably, the current in the external path is made as large as possible consistent with the ability of the series pass regulator 56 to regulate the voltage level at the input/output port.

Another beneficial feature of the illustrated arrangement is that it uses a minimum of input and output ports or pins. The input/output port 28 provides a current input to the start-up switch 60, a current (or voltage) output for powering other circuitry, and a convenient point for connecting a filter capacitor. Thus, the regulator 10 is readily adaptable for inclusion on an integrated circuit chip because of the minimum pin count required. Of course, that fact that the regulator 10 dissipates very little power is another significant reason why it is readily includable on an integrated circuit chip which may also include other circuitry.

Another benefit of the illustrated arrangement is that the series pass regulator 56 is protected even though a short may occur between port 28 and ground. Should such a short occur, the start-up switch 60 will not receive enough voltage to remain actuated, wherefore it will revert to its OFF condition. Thus, the regulator 56 will also be turned off via the lead 64 and will pass no more current to the port 28. However, current continues to be supplied to the horizontal oscillator so that the sweep-derived source 18 continues to operate.

Figure 2:
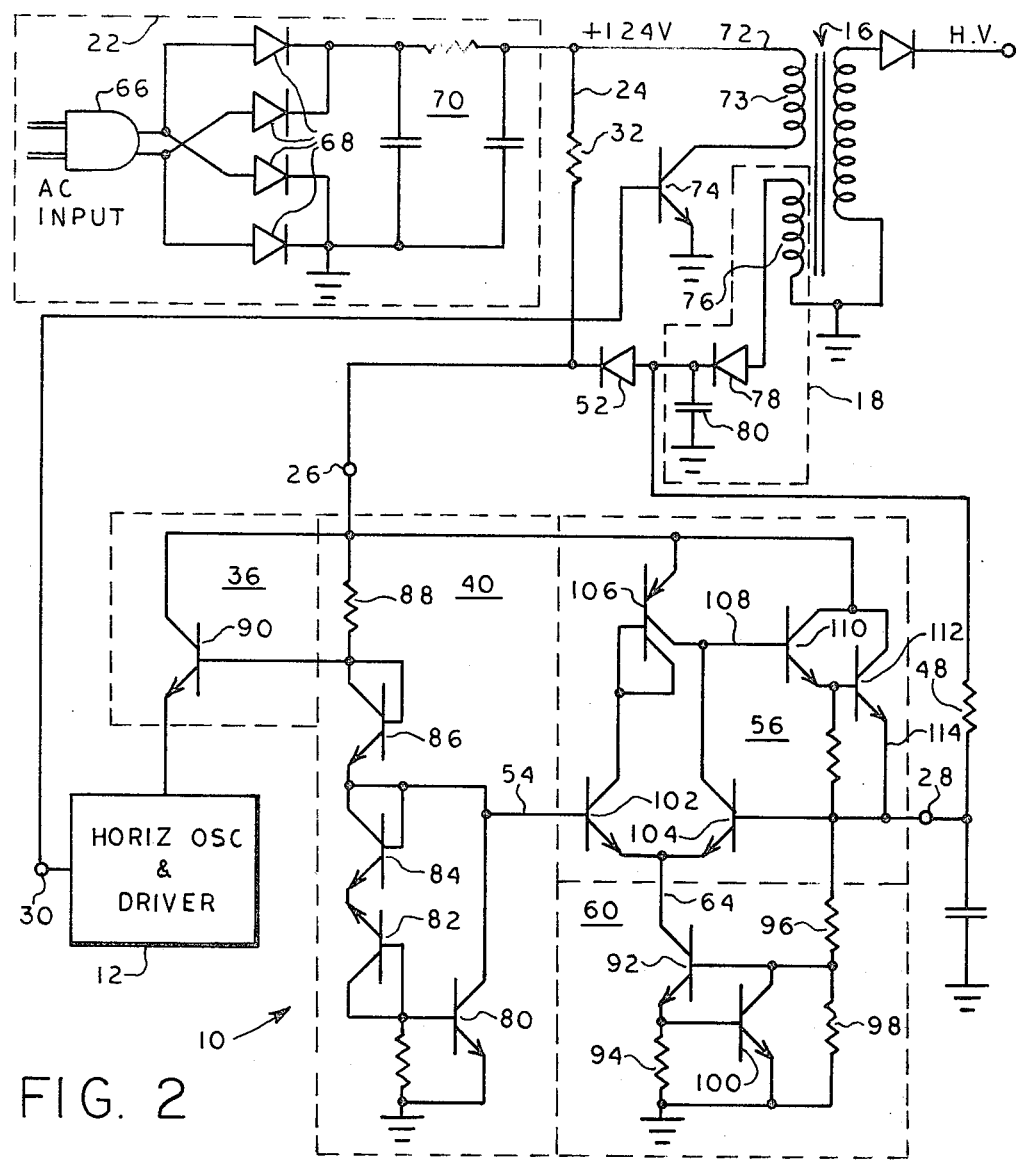
FIG. 2 is a detailed circuit diagram of the regulator and circuit elements shown in FIG. 1.

Referring now to FIG. 2, a detailed circuit diagram of the sources 22 and 18 and the regulator 10 is shown. The illustrated line-derived source 22 includes a plug 66 for receiving a 115 volt AC input, diodes 68 for rectifying the AC voltage, and an RC filter 70. The output of the source 22, shown as 124 volts, is coupled via the lead 24 and the resistor 32 to the input port 26 of the regulator 10.

The output of the source 22 is also coupled via a lead 72 to a primary winding 73 of the horizontal output transformer 16. The other end of the primary winding is coupled to the collector of a horizontal output transistor 74 which is driven from the port 30 by the horizontal oscillator and driver 12.

The source 18 is shown as including another transformer winding 76 magnetically coupled to the winding 73, a diode 78 for rectifying the signal derived from the winding 76, and a filter capacitor 80. The output of the source 18 is typically 12 volts DC and is applied via the diode 52 to the input port 26.

It should be noted that the illustrated construction of the sources 18 and 22 is exemplary of the many types of construction which may be employed.

Referring to the regulator 10, the voltage reference generator 40 thereof may include transistors 80, 82, 84 and 86 interconnected as shown to develop a temperature-compensated reference voltage of approximately 8 volts on the lead 54 responsive to input current received from the input port via a resistor 88. The junction between the resistor 88 and the transistor 86 feeds a voltage of approximately 8.6 volts to the buffer 36. In this embodiment, the buffer 36 includes a transistor 90 whose collector is coupled to the input port 26 and whose emitter drives the horizontal oscillator and driver 12. Thus, when the input port receives current from the source 22, that current is coupled through the resistor 88 and part thereof to the base of the transistor 90 for initially energizing the horizontal oscillator and exciting the transformer 16. If the voltage at pin 26 is of a sufficient magnitude, transistor 82 breaks down and conducts; the resultant voltage drop across the transistors 80, 82, 84, 86 develops a voltage of 8.6 volts at the base of the transistor 90. Such breakdown is not required to energize the horizontal oscillator, however, and a lesser current will suffice provided it is of sufficient magnitude to turn on the transistor 90.

The start-up switch 60 is a voltage controlled current sink and includes a transistor 92 whose emitter is grounded through a resistor 94 and whose base is coupled to the input/output port 28 through a resistor 96. Another resistor 98 operates with the resistor 96 to form a voltage divider whereby a selected portion of the voltage present at the input/output port is applied to the base of the transistor 92. Another transistor 100 is coupled across the base-emitter junction of the transistor 92 for controlling the value of the emitter current in the transistor 92. With this arrangement, the transistor 92 remains off until the transformer 16 is excited by the horizontal oscillator, whereupon the source 18 is activated for supplying current to the input/output port 28. A portion of that current flows to the base of the transistor 92 via the resistor 90 for turning on the latter transistor. Consequently, a current is developed in the lead 64 for turning on the series pass regulator 56.

The regulator 56 includes a pair of transistors 102 and 104 interconnected as a differential amplifier which remains off until a sink current is developed in the lead 64 by the start-up switch. The base of the transistor 102 receives the 8 volt reference voltage on the lead 54 and the base of the transistor 104 receives the voltage at the input/output terminal 28. Any difference between the reference voltage and the voltage at the input/output port results in a corresponding difference in the collector currents of the transistors 102 and 104. Those collector currents are received by another transistor 106 which also receives at its emitter the current applied to the input port 26. The transistor 106 is connected as shown to function as a so-called current mirror, whereby its output at lead 108 is a current whose value is a function of the difference between the collector currents of transistors 102 and 104.

A pair of darlington-connected transistors 110 and 112 receive the current on the lead 108 and, at their common collector terminal, the current from the input port 26. The transistors 110 and 112 supply current via a lead 114 to the input/output port 28 as a function of the value of the current received on the lead 108. Hence, the series pass regulator, in effect, couples current from the input port to the input/output port as a function of the difference between the reference voltage on the lead 54 and the value of the voltage at the input/output port. The result is that the series pass regulator holds the input/output port substantially at the level of the reference voltage while current is being delivered to the input/output port, including current received by the input/output port from the source 18 via the resistor 48.

The embodiment of FIG. 2 operates as described above with reference to FIG. 1. That is, a substantial amount of load current drawn by other circuitry flows through the resistor 48, and the remainder is supplied by the series pass regulator 56. Substantially all of that current is supplied, at least indirectly, by the source 18 which is switched in-circuit by the diode 52 when the transformer 16 becomes excited.

In order to maximize the utility of the voltage regulator 10, it is preferred that the regulator be capable of operating in a variety of models of receivers, including battery-operated receivers. Thus, a single integrated circuit chip which includes such a regulator could be used in a number of receiver models to thereby lower the cost of the chip. The regulator 10 provides that flexibility.

Figure 3:
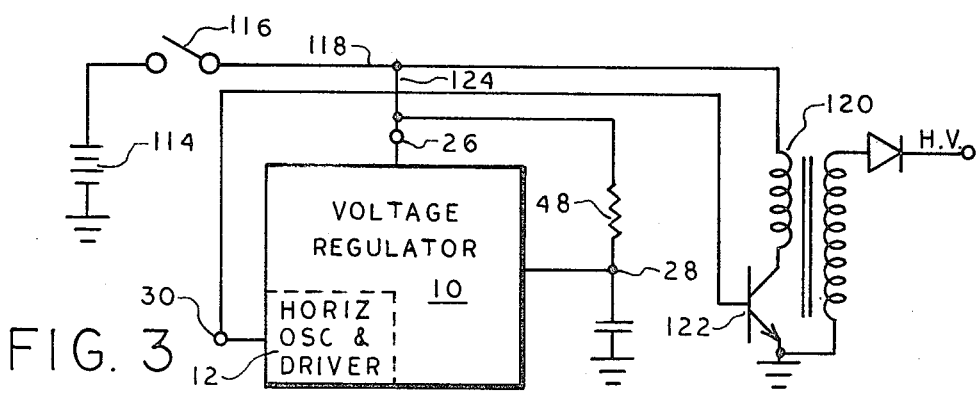
FIG. 3 is a schematic illustration depicting how the voltage regulator of FIG. 2 may be incorporated in a television receiver powered by a DC voltage source.

For example, FIG. 3 shows a voltage regulator 10 in a television receiver whose power source 114 may be a battery or the electrical system of an automobile. A switch 116 couples the source 114 to a lead 118 for driving the primary winding 120 of a horizontal output transformer. The other end of the winding 120 connects to the collector of a horizontal output transistor 122 which is driven by the horizontal oscillator and driver 12 via the port 30.

The lead 118 couples to another lead 124 for supplying current to the input port 26 and, via the resistor 48, to the input/output port 28. With this arrangement, the horizontal oscillator is energized immediately when the switch 116 is closed. Also, the start-up switch 60, the voltage reference generator 40 and the series pass regulator 56 (FIGS. 1 and 2) are also activated when the switch 116 is closed.

Because the arrangement shown in FIG. 3 has no sweep-derived source and because the start-up switch assumes its ON position as soon as the switch 116 is closed, the "start-up" function is essentially by-passed. However, the regulator 10 retains the advantage of being a lower power device because a substantial portion of load current drawn from the input/output port 28 is supplied by the external path through the resistor 48.

Figure 4:
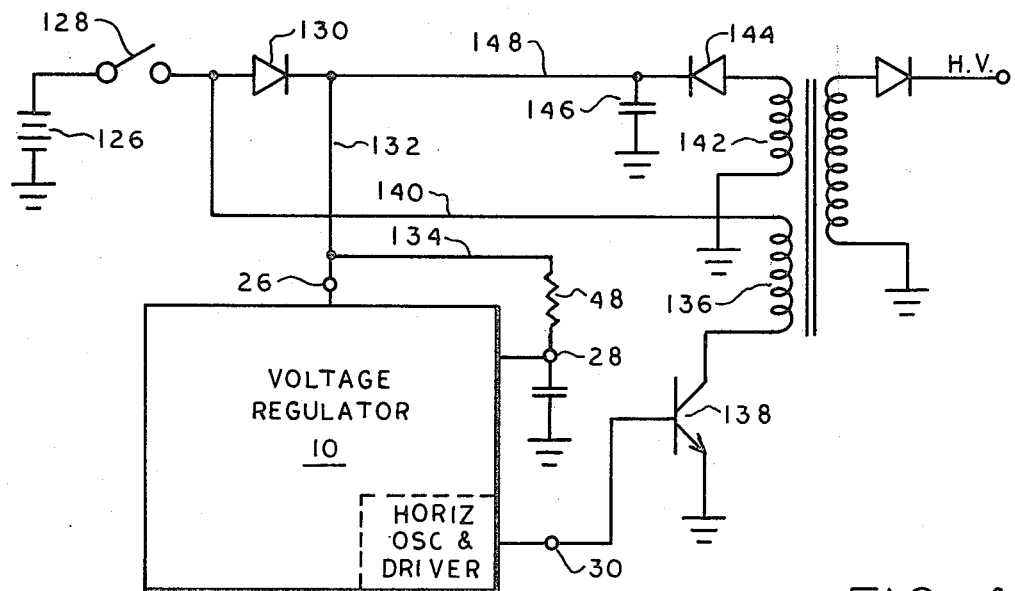
FIG. 4 is a schematic illustration depicting another way of incorporating the voltage regulator of FIG. 2 in a television receiver powered by a DC voltage source.

In the case of a receiver having a very small screen, it is frequently desirable to power the receiver from a battery pack having a small physical size in order to keep the size of the receiver's cabinet small. Thus, a battery pack might be selected whose output voltage is less than nominal (12 volts, for example). The regulator 10 is, nevertheless, adaptable for use in such an environment, as shown in FIG. 4.

In the illustrated example, the receiver includes a battery source 126, which may be six "D" size flashlight cells, coupled to a switch 128. When the latter is closed, power is applied through a diode 130 and a lead 132 to the input port 26 of the voltage regulator 10. In addition, a lead 134 couples power through the resistor 48 to the input/output port 28. Thus, the horizontal oscillator is energized immediately for exciting a primary winding 136 of the horizontal output transformer via a horizontal output transistor 138. The other end of the winding 136 is returned to the switch 128 by a lead 140.

Magnetically coupled to the winding 136 is another winding 142 for generating a sweep-derived 12 volt supply. The output of the winding 142 is rectified by a diode 144, filtered by a capacitor 146, and coupled via a lead 148 to the junction of the diode 130 and the lead 132. As the voltage developed by the winding 142 increases, the supply voltage on the lead 132 also rises, thus raising the voltage applied to the horizontal oscillator. When the voltage supplied by the winding 142 exceeds the voltage available from the battery source 126, the diode 130 becomes reverse biased and decouples the source 126 from the input port 26 and from the input/output port 28.

As the voltage on lead 132 rises toward its nominal value of 12 volts, the start-up switch in the regulator 10 turns on, the series pass regulator is activated, and the input/output port 28 supplies a regulated voltage for powering circuitry in the receiver.

One advantage resulting from using the regulator 10 in a battery operated receiver is that receiver start-up occurs even with battery voltages of six volts, or perhaps lower. In addition, the high efficiency of the regulator helps to extend the receiver's playing time by keeping the current drain on the battery pack to a minimum. Useful battery life is also extended because the voltage at the input/output port 28 remains regulated even when the sweep-derived voltage on lead 138 drops as a result of declining battery voltage.

As will be appreciated from the foregoing description, the disclosed voltage regulator is power efficient, reliable and inexpensive. It is also well suited for construction on an integrated circuit chip, particularly in view of the low number of input/output pins required and because of the low power consumption of the regulator.

Although the invention has been described in terms of a preferred structure, it will be obvious to those skilled in the art that many alterations and modifications thereto may be made without departing from the invention. For example, the start-up switch and the series pass regulator illustrated herein, although of the preferred construction, may obviously be modified.

Moreover, the sources for powering the voltage regulator may vary, depending on the type of receiver employed. Accordingly, it is intended that all such alterations and modifications be included within the spirit and scope of the invention as defined by the appended claims.

What is claimed is:

1. In a television receiver having a powerline source, a horizontal oscillator for exciting a horizontal sweep system, and a voltage source derived from the excited sweep system, a voltage regulator for energizing the horizontal oscillator and for developing a regulated D.C. voltage for use in the receiver, comprising:

an input adapted to receive current from the powerline source;

means responsive to current received at said input port for initially energizing the horizontal oscillator such that the horizontal sweep system becomes excited for energizing the sweep-derived voltage source;

an input/output port;

means for establishing a current path from the sweep-derived voltage source to the input/output port;

switch means adapted to assume a first condition responsive to the input/output port being driven to less than a minimum voltage level by the current from the sweep-derived voltage source, and adapted to assume a second condition responsive to the input/output port being driven to at least the minimum voltage by the current from the sweep-derived voltage source; and regulator means responsive to the switch means being in its second condition for coupling current from the input port to the input/output port such that the latter port is held at a regulated voltage level while current from the sweep-derived voltage is also received at the input/output port via the current path, whereby the horizontal oscillator is energized for exciting the horizontal sweep system, and a regulated voltage for supplying current derived from both the input port and the current path is thereafter available at the input/output port.

2. A voltage regulator as set forth in claim 1 wherein said means for energizing the horizontal oscillator, said switch means and said regulator means are all contained within an integrated circuit chip, wherein said input port and said input/output port constitute a pair of input and input/output pins, respectively on said chip, and wherein said current path is established by resistive means external to the chip, the value of said resistive means being selected such that a substantial amount of current drawn from the input/output port by circuitry external to the chip is carried through said resistive means so that power dissipated within the chip is held to a low level.

3. A voltage regulator as set forth in claim 1 or 2 further including a reference voltage generator coupled to the input port for developing a reference voltage responsive to a minimum current received at the input port, wherein said means for energizing the horizontal oscillator receives the reference voltage for application thereof to the horizontal oscillator, and wherein said regulator means receives the reference voltage for holding the potential of the input/output port substantially at the level of the reference voltage.

4. A voltage regulator as set forth in claim 1 including means responsive to excitation of the sweep system for augmenting current from the power-line source to the input port with a substantial current from the sweep-derived voltage source such that substantially all current available at the input/output port is derived from the sweep-derived voltage following excitation of the sweep system.

5. A voltage regulator as set forth in claim 4 wherein said regulator means comprises a series pass regulator for regulating the flow of current from the input port to the input/output port as a function of the difference between the value of the reference voltage and the value of the voltage at the input/output port.

6. A voltage regulator as set forth in claim 5 wherein said switch means includes a transistor current source for said series pass regulator, the current source being adapted to turn on responsive to the input/output port being driven to at least said minimum voltage by the current from the sweep-derived voltage source.

7. In a television receiver having a power-line source, a horizontal oscillator for exciting a horizontal sweep system, and a voltage source derived from the excited sweep system, a voltage regulator for energizing the horizontal oscillator and for developing a regulated D.C. voltage for use in the receiver, comprising:
an input port adapted to initially receive current from the power-line source;
a reference voltage generator responsive to a predetermined minimum current received by the input port for developing a reference voltage therefrom;
means coupled to the reference voltage generator and responsive to a current less than the predetermined minimum current at the input port for initially energizing the horizontal oscillator to excite the sweep system, and for applying the reference voltage to the horizontal oscillator when the predetermined minimum current is received at the input port for stabilizing the operation of the horizontal oscillator;
means responsive to excitation of the sweep system for augmenting current from the power-line source to said input port with a substantial current from the sweep-derived voltage source such that the input port receives at least said predetermined minimum current;
means for establishing a current path from the sweep-derived voltage source to the input/output port, said path including resistive means for determining the amount of current flowing in said path;
a start-up switch adapted to receive current from the input/output port and responsive to the latter port being driven to at least a minimum value of voltage for assuming an ON condition, and adapted to assume an OFF condition when the voltage at the input/output port is less than the minimum value; and
regulator means receiving the reference voltage and responsive to the start-up switch being in an ON condition for coupling current from the input port to the input/output port such that the latter port is held at the level of the reference voltage while current from the sweep-derived voltage is also received at the input-output port via said current path,
whereby the horizontal oscillator is immediately energized for exciting the sweep system and activating the sweep-derived voltage source and, subsequent to the excitation of the sweep system, the input port receives at least the predetermined minimum current for establishing the reference voltage, and the input/output port provides a current at the reference voltage level, the latter current being derived from the sweep-derived voltage.

8. In a television receiver having at least one power source and a horizontal oscillator for exciting a sweep system, a voltage regulator for energizing the horizontal oscillator and for developing a regulated D.C. voltage for use in the receiver, comprising:
an input port adapted to receive current from a power source;
means responsive to current received at the input port for energizing the horizontal oscillator so that the sweep system is excited;
an input/output port;
a series pass regulator adapted to be turned off and on for coupling current from the input port to the input/output port and for holding the potential of the input/output port at a regulated voltage level when the regulator is turned on;
means for establishing a current path between a power source and the input/output port, said path including resistive means for determining the flow of current to the input/output port; and
an electronic switch coupled to the input/output port and responsive to the input/output port being driven to at least a minimum voltage by the current in said current path for turning the series pass regulator on so that the input/output port is capable of providing, at a regulated voltage level, output current received via the input port and the current path.

9. A voltage regulator as set forth in claim 8 wherein the power source comprises a D.C. voltage source as an input to the receiver, wherein the D.C. voltage source is coupled to said input port, and wherein said current path couples current from the D.C. voltage source to the input/output port so that all current available at the input/output port is derived from the D.C. voltage source.

10. A voltage regulator as set forth in claim 8 wherein the D.C. voltage comprises a power source input to the receiver, wherein the receiver includes a sweep-derived voltage source, wherein the D.C. voltage is initially applied to the input port and to the input/output port via said current path, and further including means responsive to excitation of the sweep system for effectively decoupling said D.C. voltage source from the input port and the input/output port and for coupling the sweep-derived voltage source to both of said ports.

* * * * *